Aug. 5, 1969  O. GREENE  3,458,993

BALL CHAIN CONNECTOR ELEMENT

Filed Oct. 17, 1967

INVENTOR.
OSCAR GREENE

BY
Edward F. Levy
ATTORNEY

United States Patent Office 3,458,993
Patented Aug. 5, 1969

3,458,993
BALL CHAIN CONNECTOR ELEMENT
Oscar Greene, 115 E. 86th St., New York, N.Y. 10028
Filed Oct. 17, 1967, Ser. No. 675,950
Int. Cl. B21l *13/00;* F16g *11/14*
U.S. Cl. 59—35                                7 Claims

ABSTRACT OF THE DISCLOSURE

A ball chain connector having a tubular body with a central aperture sized for passage of the end ball of a ball chain therethrough, an aperture at each end of the connector body, and a slit connecting each end aperture to said central aperture for the insertion of a chain and ball into each end of the tubular body. A bendable tongue is formed integrally with one longitudinal edge of the central aperture, the tongue being normally in an upstanding position to clear the central aperture for insertion of the chain end balls therein, and being depressible after insertion of said balls, to a blocking position, in which it extends across the central aperture and prevents the inserted balls from being accidentally released therethrough.

---

The present invention relates to connector elements for ball chains consisting of miniature metal balls interconnected by straight links. Such chains are commonly used as pull chains for electric lights or other electrical installations, and short lengths of such chain are very often employed for mounting and carrying keys. When the chain is used to carry keys, a short length is provided, and this is arranged in the form of a closed loop by attaching both ends of the length to a connector element. A ball chain connector of this general type is well-known, and is shown, for example, in U.S. Patent No. 1,103,760.

Such connector is in the form of a tubular metal element having a central aperture through which the terminal ball at one end of the chain is inserted. This central aperture is connected by narrow slits to apertures at each end of the connector, and after each terminal ball has been inserted in the central aperture, it is pulled over to a mounted position at one end of the connector by sliding the link attached to the ball through the respective slit. The slit is slightly narrower than the diameter of said link so that it resists movement of the ball back toward the central aperture and thereby retains the chain end in coupled position within the connector.

Although such chain connectors have long been known and widely used, they suffer from the serious drawback of being incapable of reliably retaining the chain ends which have been coupled thereto. Thus, it sometimes happens that a chain end will become separated from the connector without the knowledge of the user of the chain, particularly when a chain loop mounting keys is carried in the pocket, so that the keys are separated from the chain and become lost.

It is a primary object of the present invention to provide a chain connector of the above general type which will reliably avoid acidental separation of the chain ends from the connector.

Another object of the invention is to provide a chain connector of the type described which does not substantially increase the cost of manufacture or materials beyond that of a conventional connector.

A further object of the invention is to provide a chain connector which can be very easily manipulated for the purpose of placing the connector in a condition where the coupled chain ends cannot become separated therefrom.

The invention herein contemplates the provision of a connector element for coupling ball chain ends to each other. The connector element comprises an elongated tubular body having a central aperture, a pair of end apertures, and a pair of slits respectively connecting the end portions of the central aperture to the end apertures. The central aperture is of such size that the terminal ball of each chain end may be inserted therethrough into the interior of the tubular body, and the inserted ball may then be moved, by pulling the chain, to a coupled position in which it is sealed in one end of the tubular body and out of alignment with said central aperture.

In accordance with the invention, there is provided at least one tougue formed integrally with a side edge portion of said central aperture, said tongue being initially in an upstanding position in which it leaves said central aperture unobstructed for insertion of the terminal balls of said chain ends successively therein to bring said balls to their coupled positions. The tongue is then bendable downwardly to an operative locking position in which it extends across the central aperture in alignment with the coupled terminal balls and in a position to block return movement of said balls into alignment with said central aperture, thereby preventing accidental separation of said chain ends from said coupling element. A single tongue of sufficient length to extend across the entire central aperture may be provided, or a pair of tongues may be provided at opposite sides of said central aperture, which pair of tongues when bent downwardly toward each other, meet at the center of said central aperture.

The coupling element is made of a single blank of sheet metal which is cut or stamped to provide said locking tougues and is then bent into the form of the tubular body of the connector element, with the tongue or tongues left upstanding.

Additional objects and advantages of the invention will become apparent during the course of the following specification when taken in connection with the accompanying drawings in which.

Figure 1:
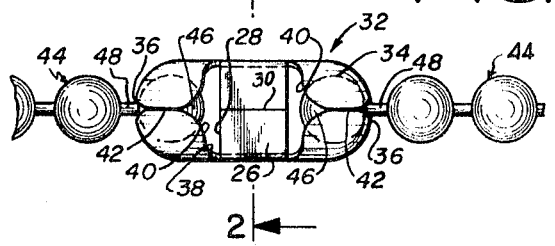
FIG. 1 is a top plan view of a connector element of the present invention showing a pair of ball chain ends coupled thereto.
Figure 2:
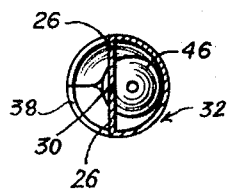
FIG. 2 is a section taken along line 2—2 of FIG. 1.
Figure 3:
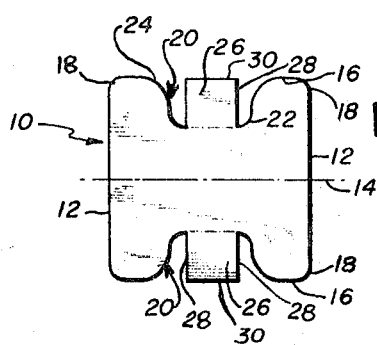
FIG. 3 is a plan view of the flat, sheet metal blank which is used to form the connector element of FIGS. 1 and 2.

Referring in detail to the drawings, FIGS. 1–5 illustrate one embodiment of a chain connector made in accordance with the invention and formed from a blank 10 which has the configuration shown in FIG. 3. This blank is made from a sheet of springy metal and is cut to the configuration shown by stamping or any other known manner. It will be noted that the blank 10 is of a generally rectangular or square outline having a pair of opposed straight end edges 12 which extend perpendicularly with respect to a central axis 14 of the blank. This axis 14 extends parallel to a pair of opposed side edges 16 of the blank which intersect the end edges 12 at the rounded corners 18. The opposed side edges 16 are respectively formed with substantially rectangular notches 20 each of which has a pair of inner rounded corners 22 and a pair of outer rounded corners 24.

In accordance with the invention herein, each of the notches 20 of blank 10 is formed with a central locking tongue 26 of rectangular shape. These locking tongues 26 are formed in the stamping of the blank 10 and are integral with the blank body, extending centrally through the respective notches 20 in a direction parallel to the blank side edges 12. The locking tongues 26 have opposed side edges 28 which terminate at the inner ends of the inner rounded corners 22 of the notches 20. Each tongue 26 terminates in an outer edge 30 which extends parallel to the axis 14 and which is substantially aligned with a respective side edge 16 of the blank 10.

To form the ball chain connecter element, the blank 10 is bent in a known manner by conventional shaping means which roll the blank into the elongated tubular and generally cylindrical shape of the chain connector element 32 shown in FIG. 1. With the exception of the locking tongues 26, the formed connector element 32 is of the conventional and well-known type, having a pair of rounded end sections 34 formed with end apertures 36 through which passes the central longitudinal axis of the tubular connector element 32.

In the formation of the connector element 32, the notches 20 of the blank 10 are brought toward each other to form a large central aperture 38 at one side of said connector element. The central aperture 38 has curved edges 40 at each end thereof, these edges merging at each end in a respective longitudinal slit 42 which connects the respective end aperture 36 with the central aperture 38, as shown in FIG. 1.

Figure 4:
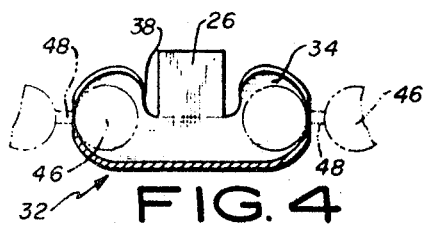
FIG. 4 is a longitudinal section through the center of a connector element, showing the structure before the locking tongues thereof had been bent to their locking positions.
Figure 5:
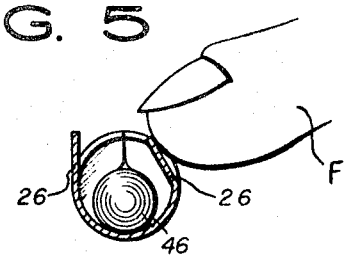
FIG. 5 is a transverse section taken in substantially the same plane as that of FIG. 2, and showing the manner in which the locking tongues are depressed by the finger into their locking positions.

When the blank 10 is initially shaped to form the tubular connector element 32, the tongues are left unbent so that they remain upstanding from the side edges of the central aperture 38 in the manner shown in FIGS. 4 and 5. This leaves the central aperture 38 unencumbered for insertion of the ends of ball-and-link chains into said aperture, whereby the chain ends are coupled to the connector element in the conventional manner. FIG. 1 shows a pair of chain ends 44 coupled to the connector element 32. This was accomplished in the usual manner by inserting the end ball 46 of one of the chain ends into the unencumbered central aperture 38 and pulling the ball 46 into one of the rounded end sections 34 of the connector element. In this movement, the link 48, associated with said end ball 46, travels through the slit 42 to the end aperture 36. In the coupled position of the chain end, the end ball 46 is thus seated in the connector end section 34, and the link 48 projects longitudinally through the end aperture 36, as shown in FIG. 1. The central aperture 38 is now clear to receive the end ball of the other chain end for similar coupling of the latter.

The longitudinal slits 42 provide some frictional resistance to the passage of the ball chain links 48 therethrough and thus tend to releasably lock the chain ends in the coupled position shown in FIG. 1. In conventional coupling elements of this type, which are not provided with locking tongues, when inward pressure is exerted on the chain ends, this frictional resistance of the slits is often insufficient to prevent the links from passing back through the slits to the central aperture, and the chain end is therefore accidentally uncoupled and released. The provision of the locking tongues 26 in accordance with the present invention render such accidental release impossible in a manner now to be described.

After the chain ends are inserted into the connector element 32 as previously described, the user bends the upstanding tongues 26 inwardly across the hollow interior of the connector element from the opposed side edges of the central aperture 38. FIG. 5 shows one of the tongues 26 being depressed downwardly and inwardly to its locking position by a finger F of the operator. This pressing movement continues until the tongue 26 is bent 90° from its original upstanding position, and then the other tongue is similarly bent. The lengths of the tongues 26 are such that when they are bent down to their final positions, their outer end edges 30 will be situated in flush abutment, as indicated in FIG. 2.

It will be observed in FIG. 2 that the bent tongues 26 extend transversely across the central aperture 38 on a plane almost at the center of the connector element 32 so that the side edges 28 of the tongues are located in the path of movement of the inserted end balls 46 and thus block movement of these balls back toward the central aperture 38. Even if the chain end is drawn inwardly toward the center of the connector element so that the end link 48 slides through the respective slit 42, the end ball 46 will engage the depressed tongues 26 and will thus be restrained from movement into the central aperture 38 sufficiently to permit the ball from being withdrawn through said aperture. It will be appreciated that since the ball engages the side edges of the tongues 26, considerable force can be exerted by the ball against the tongues without deformation or yielding of the latter.

In this simple manner it is possible for the operator to easily bend the blocking tongues 26 from their upstanding positions of FIG. 5 to their blocking positions of FIG. 2 so as to prevent unintentional separation of the balls from the connector. At the same time it is an extremely simple matter for the tongues 26 to be bent back to the position of FIG. 5, with any suitable pointed instrument such as a pencil, for example, so that the balls can intentionally be separated from the connector when required.

Figure 6:
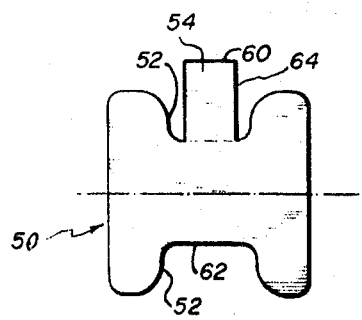
FIG. 6 is a plan view of a modified type of flat blank used to form a connector element having a single locking tongue.
Figure 7:
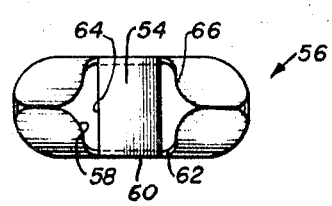
FIG. 7 is a plan view of a connector made from the blank of FIG. 6.

In the embodiment of the invention shown in FIGS. 6 and 7, the blank 50 differs from the blank 10 only in that the notches 52 are somewhat deeper and in that only one of the notches is provided with a tongue 54. In this instance, the tongue 54 is longer than either of the tongues 26.

This blank 50 is shaped into the connector element 56 shown in FIG. 7, which connector element coacts in the same manner with a ball chain 44. However, with this embodiment only the single tongue 54 need be bent from the elongated side portion of the central aperture 58 across the hollow interior of the connector 56 to a position in which it blocks separation of the balls of the chain from the connector 56. In its blocking position, the end edge 60 of the tongue 54 abuts the opposite edge 62 of the central aperture 58.

In assembling the connector element 56, it is an extremely simple matter for the operator to bend the tongue 54 from an upstanding position similar to that shown for the tongue 26 in FIG. 5 to a blocking position extending across the hollow interior of the connector element. Therefore, this construction will also reliably prevent separation of the balls from the connector 56, and at the same time it is possible for the user, with a small pointed instrument, to bend the tongue 54 back to its upstanding position to provide for intentional separation of the balls from the connector.

While preferred embodiments of the invention have been shown and described herein, it is obvious that numerous omissions, changes and additions may be made in such embodiments without departing from the spirit and scope of the invention.

What is claimed is:

1. A connector element for coupling ball chain ends to each other, said connector element comprising an elongated tubular body having a central aperture, a pair of end apertures, and a pair of slits respectively connecting the end portions of said central aperture to said end apertures, said central aperture being sufficiently large to permit the terminal ball of each chain end to be inserted therethrough into the interior of said tubular body for movement of said ball to a coupled position at one end of said tubular body and out of alignment with said central aperture, and tongue formed integrally with a side edge portion of said central aperture, said tongue normally in an inoperative upstanding position in which said central aperture is unobstructed thereby for insertion of said terminal balls therein, said tongue being manually bendable to an operative locking position in which it extends across the interior of said central aperture in alignment with said coupled terminal balls and in a position in which it blocks return movement of said balls into alignment with said central aperture, thereby preventing separation of said chain ends from said connector body.

2. A connector element according to claim 1 in which said tongue has parallel side walls and a free end wall, said tongue being of sufficient length to extend across the width of said central aperture when bent to said locking position with said end wall engaging the side edge portion of the central aperture opposite to the side edge portion with which said tongue is integral, said tongue being of such width that in locking position the side walls thereof are spaced from the end portions of the central apertures by distances substantially less than the diameter of the coupled balls.

3. A connector element according to claim 1 in which the side edges of said central aperture extend substantially parallel to the longitudinal axis of said elongated tubular body, and in which a pair of tongues are formed integrally with the respective side edges, each of said tongues being bendable downwardly toward each other from upstanding positions to locking positions in which their end walls are parallel and proximate to each other at the center of said central aperture.

4. A connector element according to claim 1 in which said tubular body is made of a springy metal.

5. A blank for forming a tubular chain connector for interconnecting ball chain end portions, said blank consisting of a single sheet metal member having a pair of opposed side edges and a pair of opposed end edges, said sheet metal member being formed between said side edges, each of said side edges having a notch formed at the central portion thereof and extending inwardly of said sheet metal member, and at least one tongue of substantially rectangular configuration formed integrally with said sheet metal member and projecting centrally through one of said notches at least up to the region of the side edge of said blank which is formed with the notch in which said tongue is located.

6. A blank according to claim 5 in which a pair of said tongues are respectively located in said pair of opposed notches.

7. A blank according to claim 5 in which said sheet metal member has a single tongue, said tongue extending outwardly beyond the side edge which is formed with the notch in which said tongue is located.

References Cited

UNITED STATES PATENTS

| | | | |
|---|---|---|---|
| 1,103,760 | 7/1914 | Goodridge | 59—95 |
| 1,380,244 | 5/1921 | Otis | 59—95 |
| 1,423,280 | 7/1922 | Urich | 24—116 |
| 2,378,655 | 6/1945 | Popp | 59—95 |
| 2,449,167 | 9/1948 | Hopewell | 24—116 |

CHARLES W. LANHAM, Primary Examiner

G. P. CROSBY, Assistant Examiner

U.S. Cl X.R.

24—116; 59—91, 95